United States Patent [19]
Murase et al.

[11] Patent Number: 5,178,447
[45] Date of Patent: Jan. 12, 1993

[54] EDGE LIGHT PANEL

[75] Inventors: Shinzo Murase; Hirokazu Matsui, both of Ohtsu, Japan

[73] Assignee: Kabushiki Kaisha Meitaku Shisutemu, Shiga, Japan

[21] Appl. No.: 722,548

[22] Filed: Jun. 26, 1991

[30] Foreign Application Priority Data

Jun. 26, 1990 [JP] Japan .................. 2-168110
Mar. 19, 1991 [JP] Japan .................. 3-080869

[51] Int. Cl.$^5$ .............................. F21V 8/00
[52] U.S. Cl. ........................ 362/31; 362/26
[58] Field of Search .......... 362/31, 32, 26, 27, 362/330; 359/49, 50

[56] References Cited

U.S. PATENT DOCUMENTS

| | | | |
|---|---|---|---|
| 2,214,209 | 9/1940 | Triplett | 362/31 |
| 2,347,665 | 5/1944 | Christensen et al. | |
| 3,040,168 | 6/1962 | Stearns | 362/31 |
| 4,371,916 | 2/1983 | De Martino | 362/31 |
| 4,714,983 | 12/1987 | Lang | 362/27 |
| 4,729,068 | 3/1988 | Ohe | 362/31 |
| 4,799,753 | 1/1989 | Breitbarth et al. | 362/32 |
| 4,811,507 | 3/1989 | Blanchet . | |
| 4,860,171 | 8/1989 | Kojima . | |
| 4,937,709 | 6/1990 | Yanagi et al. . | |
| 4,965,950 | 10/1990 | Yamada . | |
| 4,975,807 | 12/1990 | Ohashi | 362/26 |
| 4,985,809 | 1/1991 | Matsui et al. | 362/31 |
| 5,124,890 | 6/1992 | Choi et al. | 362/27 |

FOREIGN PATENT DOCUMENTS

| | | |
|---|---|---|
| 57-128383 | 8/1982 | Japan . |
| 60-205576 | 10/1985 | Japan . |
| 62-902 | 1/1987 | Japan . |
| 2-126501 | 5/1990 | Japan . |

Primary Examiner—Allen M. Ostrager
Assistant Examiner—L. Heyman
Attorney, Agent, or Firm—Wenderoth, Lind & Ponack

[57] ABSTRACT

There is provided an edge-illuminating emitter panel or edge light panel in a liquid crystal display device. The edge light panel includes a transparent resin substrate having an irregular reflection surface with a mesh pattern formed thereon. A mesh size of the pattern varies with the distance away from a primary light source which is juxtaposed with a side of the substrate. The side is so finished as to provide a rough surface for permitting light issued from the light source to effectively enter the substrate. The rough surface is continually formed along the side. The thus formed rough surface ensures the light incident on the side a sure entrance as well as a sure difusion thereof, whereby the edge light panel improves the display device in brightness and uniformity of in display clarity. The rough surface may be formed intermittently or formed on at least a part of the side. The rough surface may be so formed as to have its roughness vary stepwise or continuously with the distance away from the light source.

18 Claims, 8 Drawing Sheets

EDGE LIGHT PANEL

BACKGROUND OF THE INVENTION

1. Field of the Invention

This invention relates to an edge light panel element for a surface light source device used in various illuminating apparatus such as a back light unit for liquid crystal display devices, illuminated display devices, illumination signboards, and the like.

2. Prior Art

A surface light source device of this type normally comprises an edge light panel having a thickness of several (typically from five to six) millimeters. The device has at least one light source, such as a fluorescent lamp, juxtaposed with a side of the panel to permit light issued from the lamp to enter the panel through the side, so that the panel may be evenly illuminated with the light at a intensity of high brightness.

The edge light panel normally comprises a transparent resin substrate which is made of material excellent in light transmittivity, such as an acrylic resin or the like. The panel has its surface so finished as to carry thereon a layer providing a mesh pattern. The pattern may be produced through a screen printing process using a white or pale ink containing white pigments such as titanium oxide or the like, so that the pattern enables the panel to reflect the light irregularly in such a manner that the panel is evenly illuminated with the light through the entire surface thereof. In other words, the light issued from the light source has its intensity vary continuously so as to be represented as a function of a measurement point on the surface of the panel. It is also possible to finish the surface of the substrate of the panel so as to have the surface carry thereon a layer providing a fine dotted pattern or a linear pattern, which pattern may be produced through a blasting process or an appropriate molding process. In any case, the underlying idea is that the light incident on an edge (i.e., the side) of the edge light panel is irregularly reflected or scattered by the surface layer so as to effectively enter the panel and be transmitted as far away as possible within the panel, so that the panel may be evenly illuminated by the light through the entire surface thereof, which enables the panel to improve the display device in brightness and uniformity of display clarity.

Each of the remaining sides of the transparent resin substrate, which sides are not subjected to the incident light, is backed with a reflective tape excellent in reflectivity. As disclosed in Japanese Patent Application No. Hei 2-46419, each of the remaining sides of the substrate is mirror-finished. The side on which the light is incident is so finished as to be smooth and reflective, whereby any faults are removed from the side.

In recent years, surface light source devices of this type described above have been widely used in built-in liquid crystal back light units of wrap-top type personal computers and word processors, and the demand for such devices has been growing rapidly.

A surface light source device for these applications should be very compact and thin and, more specifically, it is often required to have a thickness of less than that of any existing devices, or a thickness of from 2 to 3 millimeters, or in some cases, to have a thickness of 1.5 millimeters.

As the thickness of the edge light panel is reduced, uniformity in brightness of the panel surface becomes poor. This is due to the fact that the incident light issued from the primary light source is apt to be transmitted in an oblique direction along the inner surface of the panel, and particularly to the fact that the primary light source, such as fluorescent lamps or cold cathode ray tubes, is not necessarily coincident in length with the side of the edge light panel to which side the light source is juxtaposed, and the fact that the primary light source is poor in brightness near its opposite ends. The net result of these and other problems may be a surface light source device whose brightness is differs between locations on the surface of the panel, such as the central raised area and the lateral and front sides of the raised area.

In view of these circumstances, it is the object of the present invention to provide an edge light panel which is free from unevenness in brightness particularly in the vicinity of the primary light source, to enable the panel to realize uniformity in brightness to a maximum extent.

SUMMARY OF THE INVENTION

In the course of intensive research efforts in order to achieve the above object of the invention, the inventors of the present invention discovered that an excellent uniformity in brightness of an edge light panel is effectively produced when the edge or side of the transparent resin substrate of the edge light panel with which the primary light source is juxtaposed is entirely or partially roughened. More specifically, according to a first aspect of the present invention, the above object is achieved by providing an edge light panel for a surface light source device, comprising a transparent resin substrate having a side juxtaposed with a primary light source to permit light issued from the light source to effectively enter the substrate through the side, wherein the surface of the side is continually or intermittently roughened along its longitudinal direction. According to a second aspect of the invention, there is provided an edge light panel for a surface light source device, comprising a transparent resin substrate having its side juxtaposed with a primary light source to permit light issued from the light source to effectively enter the substrate through the side, wherein the surface of the side is partially disposed in the vicinity of a corresponding part of the light source. According to a third aspect of the invention, there is provided an edge light panel for a surface light source device, comprising a transparent resin substrate having its side juxtaposed with a primary light source to permit light issued from the light source to effectively enter the substrate through the side, wherein the roughness of a part of the surface of the side is stepwise or continuously increased relative to that of the remaining part of the surface of the side.

According to the present invention, the rough surface of the side of an edge light panel juxtaposed with a primary light source permits light issued from the light source to effectively enter the panel through the side which diffuses the light incident thereto to improve the edge light panel in brightness and uniformity of display clarity.

DETAILED DESCRIPTION OF THE INVENTION

Now the present invention will be described in detail with reference to the accompanying drawings of preferred embodiments of the present invention.

Figure 1:
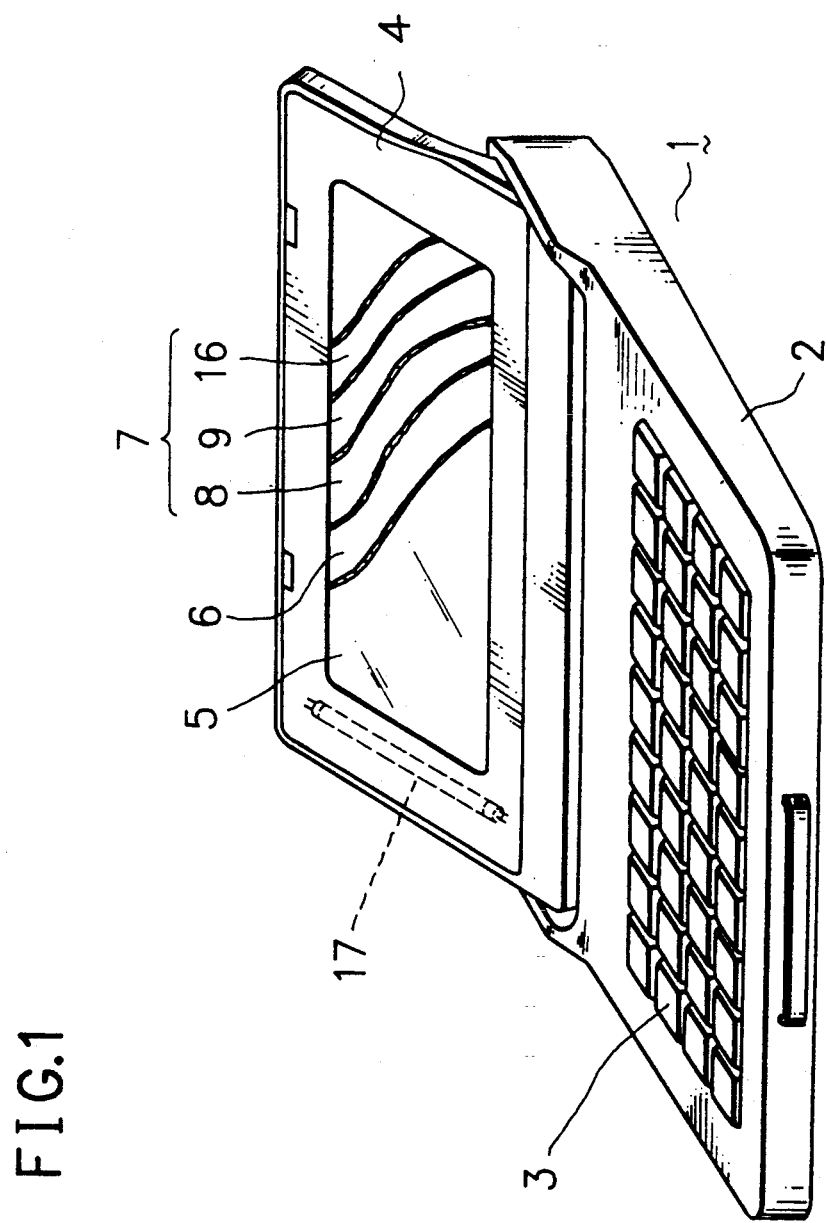
FIG. 1 is a partially broken away perspective view of a word processor in which a surface light source device, according to a first embodiment of the edge light panel of the present invention, is incorporated.
Figure 2:
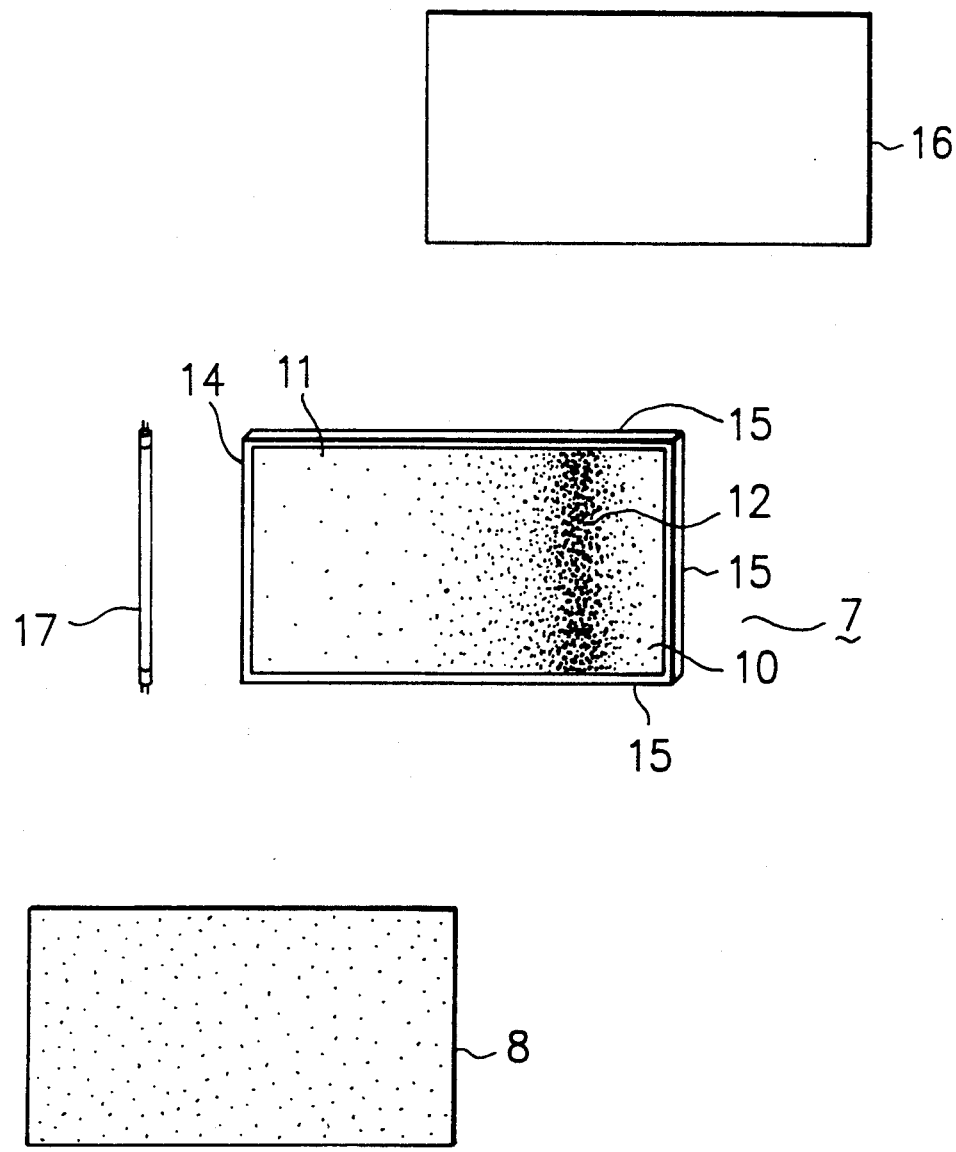
FIG. 2 is an exploded view of the surface light source device of the word processor of FIG. 1.
Figure 3:
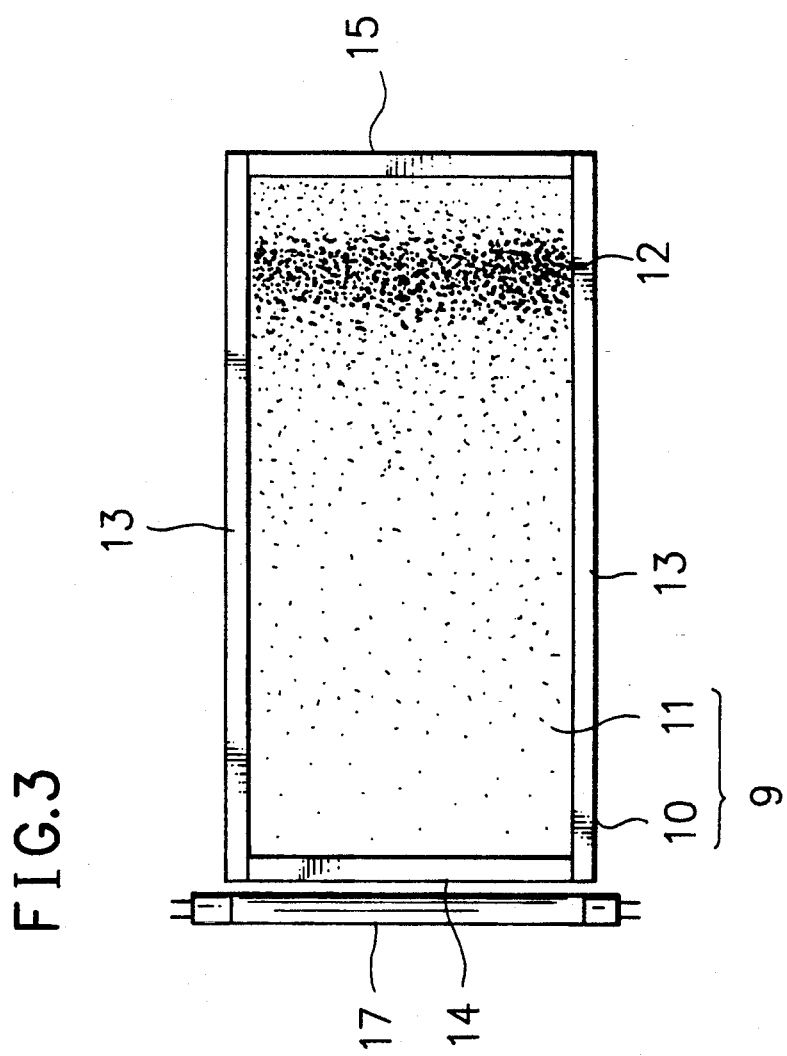
FIG. 3 is a front view of the edge light panel of the word processor of FIG. 1.
Figure 4:
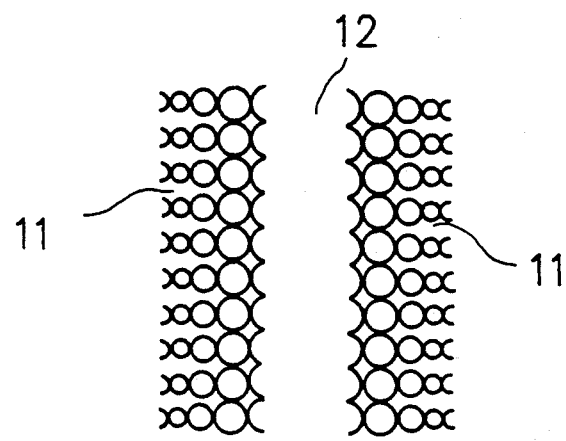
FIG. 4 is a partially enlarged front view of the surface of the edge light panel of FIG. 3, showing the densest part of the pattern in the panel.

As shown in FIGS. 1 to 3, a first embodiment of the present invention is incorporated in a portable word processor 1 which comprises a main body 2 provided with a keyboard section 3 and a display section 4. The display section 4 is swingably connected to the main body 2 and may be folded so as to cover the keyboard section 3.

The swingable display section 4 assumes a flat and thin shape with a thickness of approximately 10 millimeters and contains a wide and flat liquid crystal display panel 6 therein. The panel 6 is covered with a transparent protective panel 5 which is disposed on a front surface of the display panel 6. The display section 4 further contains therein a surface light source device 7. The device 7 is disposed behind a rear surface of the liquid crystal display panel 6 to illuminate the display panel 6 from the back thereof.

In this embodiment, the surface light source device 7 comprises: a pale polyester diffusion sheet 8; an edge light panel 9 laminated to the sheet 8; and a pale polyester reflector sheet 16 further laminated to the sheet 8 through the edge light panel 9. The surface light source device 7 further comprises: a primary light source 17 closely juxtaposed with an edge or side of the edge light panel 9 so as to permit light issued from the light source 17 to enter the panel 9 through the side; and a very thin inverter (not shown).

The edge light panel 9 has a rectangular transparent acrylic resin substrate 10 which has a size of 135×200 millimeters and a thickness of 2 millimeters, for instance. The substrate 10 is subjected to a screen printing process to form its rear surface into a dense mesh pattern irregular reflection surface 11 in which a mesh size of the pattern varies continuously. In the embodiment, a pale color ink containing 13 to 30 wt. % of solid ingredients, to which a fluorescent pigment and a hot forming material, such as azo-bis-isobutyronitrile, or a resin material in the form of fine beads is added, is advantageously used in the screen printing process to obtain a sufficient irregular reflection effect.

In this embodiment, the mesh size of the pattern on the irregular reflection surface 11 varies continuously such that it can be represented as a function of the distance away from the primary light source 17. For example, the mesh size varies so as to have the ratio of dark area (i.e., mesh pattern area) to light area (i.e., background area of the mesh pattern) vary continuously from 20% to 100% according to the distance away from the edge or side of the edge light panel 9. As a result, an area 12 of the 100% ratio of the dark area to the light area located in a central area of the edge light panel 9 to improve the uniformity of display brightness of the panel 9. The 100% ratio area 12 of the panel 9 of this embodiment has a width of approximately 10% of the entire length of the panel 9.

The transparent resin substrate 10 provided with the irregular reflection surface 11 as described above has specified dimensions, four edges or sides of which substrate 10 are smoothed with a cutting/finishing machine, such as a machine called PLABEAUTY PB-100 which is available from Asahi Megalo Co., Ltd., so as to remove any faults from the sides of the substrate 10, which may have resulted from cutting operations.

More specifically the side of the substrate 10, to which the primary light source 17 is closely juxtaposed, is machined by the use of the above machine at cutter feed rate of about 1.2 m/minute which is less than the maximum cutter feed rate of 1.5 m/minute suitable for mirror-finishing by approximately 20%. In this manner the thus finished surface is a rough surface 14 through which the light is effectively permitted enter the substrate 10.

In the above construction of the present invention, the light issued from the primary light source 17 effectively passes through the side to enter the substrate 10 to the maximum extent, whereby the edge light panel 9 improves the brightness and uniformity of display clarity for the display device.

Each of the remaining sides 15 of the edge light panel 9, on the other hand, is mirror-finished at the maximum cutter feed rate of the machine, i.e. at the cutter feed rate of 1.5 m/minute, so that the light having entered the edge light panel 9 is prevented from passing through the remaining sides 15 of the panel 9.

The reflector sheet 16 applied to the surface of the edge light panel 9 of this embodiment is a pale polyester sheet having a thickness of 75 $\mu$m (trade name: U2, available from Teijin Limited), whereas the primary light source 17 is a slender, compact and durable 12 V cold cathode ray tube having a diameter of 3.8 millimeters and a source brightness of 12,000 cd/m$^2$.

In the drawing, the reference numeral 13 denotes a white reflector tape which covers unprinted margins of the panel 9, each of which margins has a width of approximately 5 mm. Also covered with the reflector tape 13 is each of the mirror-finished sides of the transparent resin substrate 10, which sides prevent the light having entered the substrate 10 from passing therethrough.

In an experiment conducted by the inventors of the present invention, the embodiment proved to show a brightness of 270 cd/m$^2$ which is greater than the brightness available from the conventional edge light panel by approximately 20%. Of the 20%, it seems, approximately 10% is contributed by the dense screen printing of the largest mesh size zone 12, approximately 10% is contributed by the applied white reflector tape 13, and several % by the roughly finished side 14 for receiving incident light from the primary light source. Besides, this arrangement is particularly effective for eliminating differences in brightness, particularly near the primary light source 17, and for realizing an excellent uniformity of brightness and an enhanced irregular reflection capability of the irregular reflector surface 11, including the densely screen printed area.

Figure 5:
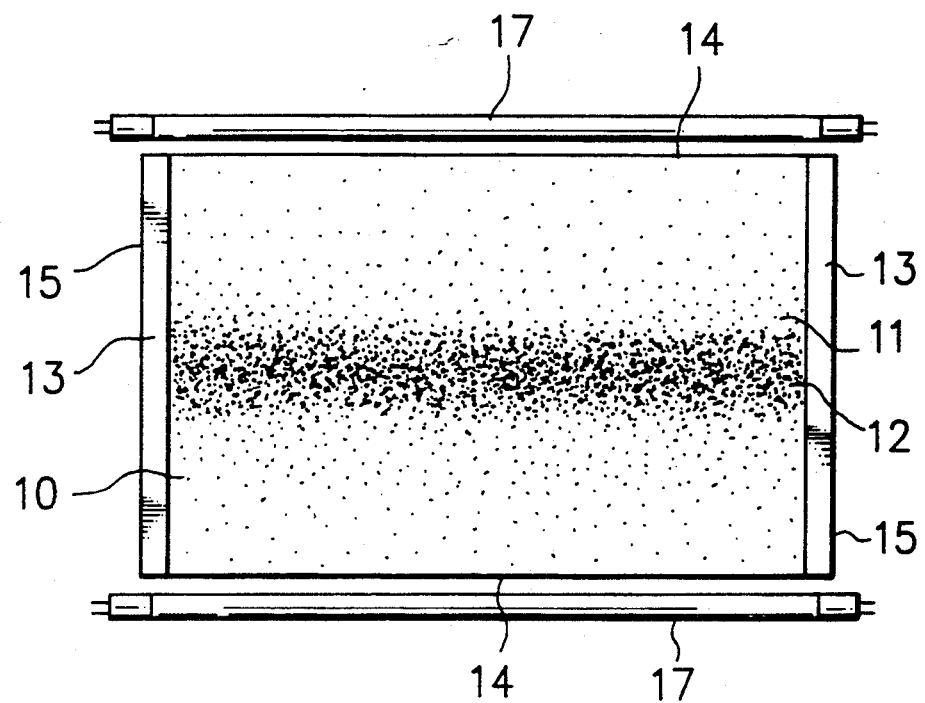
FIG. 5 is a front view of a second embodiment of the edge light panel of the present invention.

FIG. 5 illustrates a second embodiment of the edge light panel of the invention, wherein a pair of light sources 17 are arranged lateral (i.e. laterally extending) sides of the edge light panel 9. The mesh size of the patterned surface 11 for irregular reflection varies as a function of the distance from the lateral sides, and a horizontally disposed belt zone 12 for the largest mesh area is located at a vertically central position. The width of the belt zone 12 for the largest mesh area occupies approximately 20% of the height of the edge light panel 9.

Since this second embodiment is similar to the first embodiment in other respects, the components similar to those of the first embodiment are indicated by identical reference numerals and will not be further described.

Figure 6:
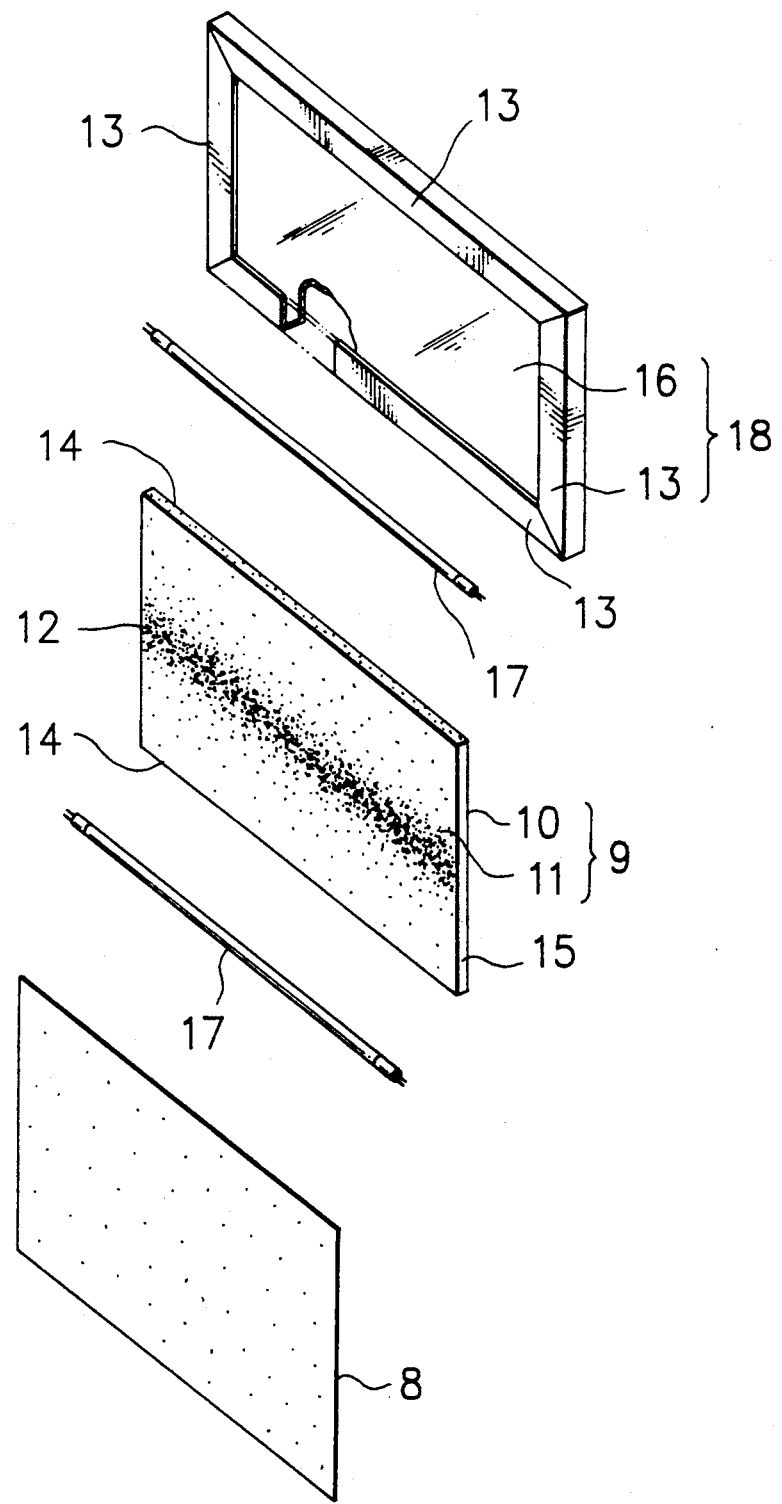
FIG. 6 is an exploded perspective view of a surface light source device according to a third embodiment of the present invention.

FIG. 6 illustrates a third embodiment of the edge light panel of the present invention, which is similar to the second embodiment in that it comprises a pair of oppositely arranged primary light sources 17. However, in the embodiment shown in FIG. 6, the reflector layers 13 on the lateral sides away from any of the primary light sources 17 are integrally formed with the reflector sheet 16 on the surface of the edge light panel to define a white sheet 18 which is surrounds the primary light sources 17 so that it may also provide a reflector layer 13 for the primary light sources 17. Since all the remaining components of this embodiment are similar to those of the preceding embodiments, they are indicated by identical reference numerals and will not be further described. An experiment conducted by the inventors of the present invention proved that the brightness of this embodiment is significantly improved as compared with an arrangement where the reflector layer 13 and the reflector sheet 16 are separated from each other, and is greater than that of any existing edge light panels by approximately 10 to 15%.

Figure 7:
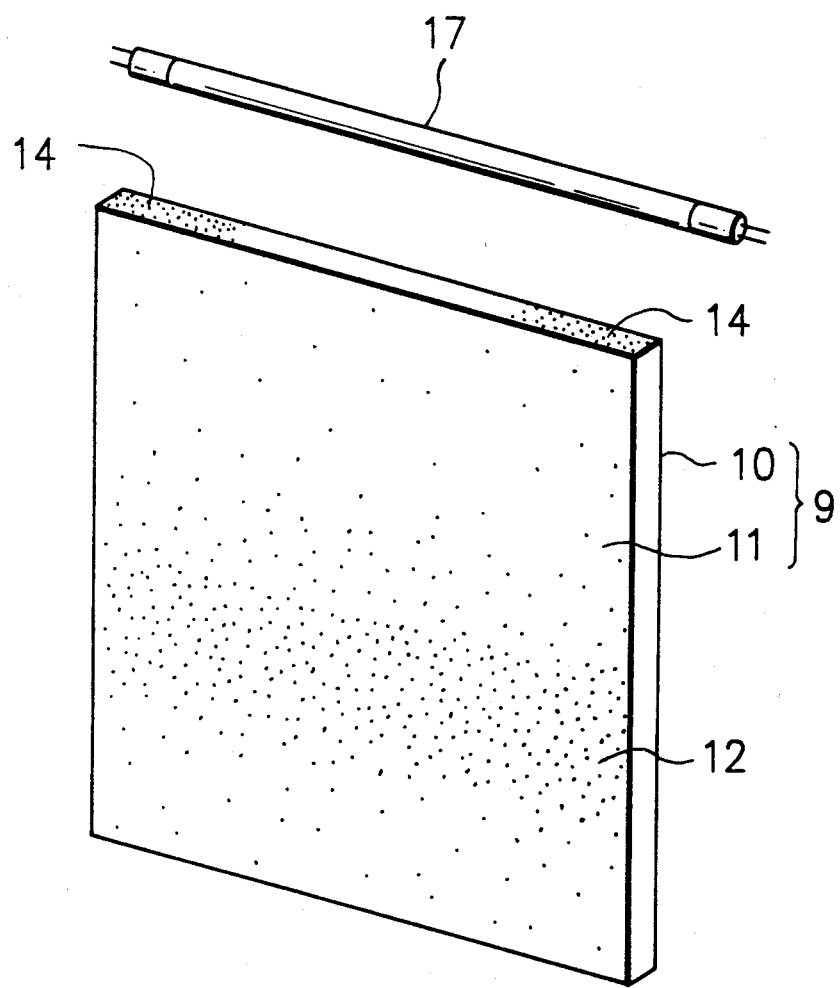
FIG. 7 is a perspective view of a fourth embodiment of the edge light panel of the present invention.
Figure 8:
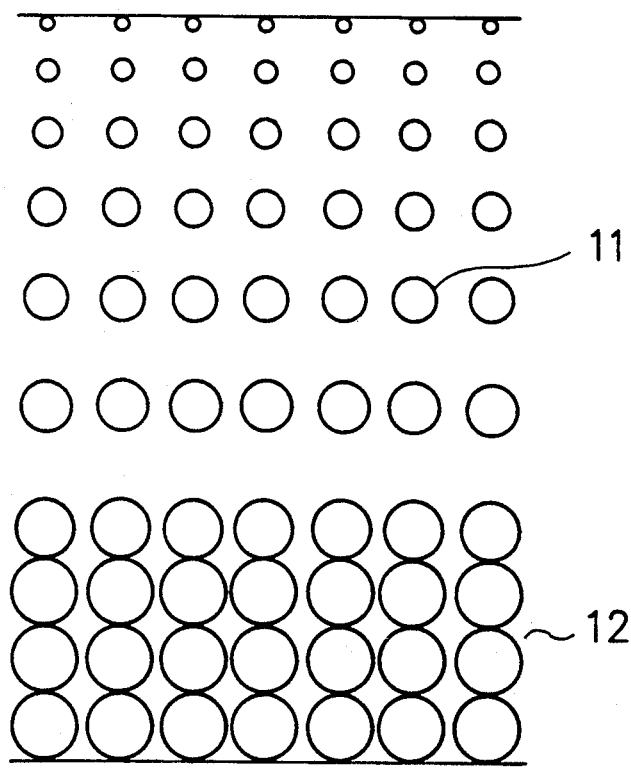
FIG. 8 is a partially enlarged front view of the irregular reflection surface of the fourth embodiment of the edge light panel of the present invention.

FIGS. 7 and 8 illustrate a fourth embodiment of the edge light panel of the present invention, wherein the coarse surface of the lateral (i.e. laterally extending) edge 14 of the edge light panel 9 for receiving incident light is limited to regions thereof close to the respective end portions of the primary light source 17. A rectangular transparent acrylic resin substrate 10, similar to that of the first embodiment illustrated in FIGS. 1 through 3, is used, and a single primary light source 17 is juxtaposed with a lateral side of the edge light panel 9 so that the end portions of the primary light source 17 are located close to the respective end portions of the juxtaposed lateral side, and so that each of said end portions 14 of said lateral side for receiving incident light is approximately 2 cm long along the length of said lateral side.

The irregular reflector surface 11 of this embodiment carries meshes whose area steplessly (or continuously) varies as a function of the distance from the primary light source 17 within the range of area ratio of 20 to 50. The meshes 12 with the largest area are arranged at an intermediate position nearer to the lateral side opposite to that of the primary light source 17 with a view to eliminating any non-uniformity in brightness. The meshes 12 having the largest area in this embodiment are arranged close to but not in abutment with one another, as illustrated in FIG. 8. Thus, while the meshes of this embodiment have an area that steplessly varies as a function of the distance from the primary light source, the zone with the meshes having the largest area is not as densely screen printed as in the case of the preceding embodiments.

Since all the remaining components of this embodiment are similar to those of the preceding embodiments, they are indicated by identical reference numerals and will not be further described. In an experiment conducted by the inventors of the present invention, this embodiment had a brightness of 250 cd/m$^2$ when a cold cathode ray tube of 12 V and 12,000 cd/m$^2$ was used for the primary light source 17 and the difference in brightness near the primary light source 17 was eliminated, bringing forth an evenly illuminated surface of the edge light panel.

Figure 9:
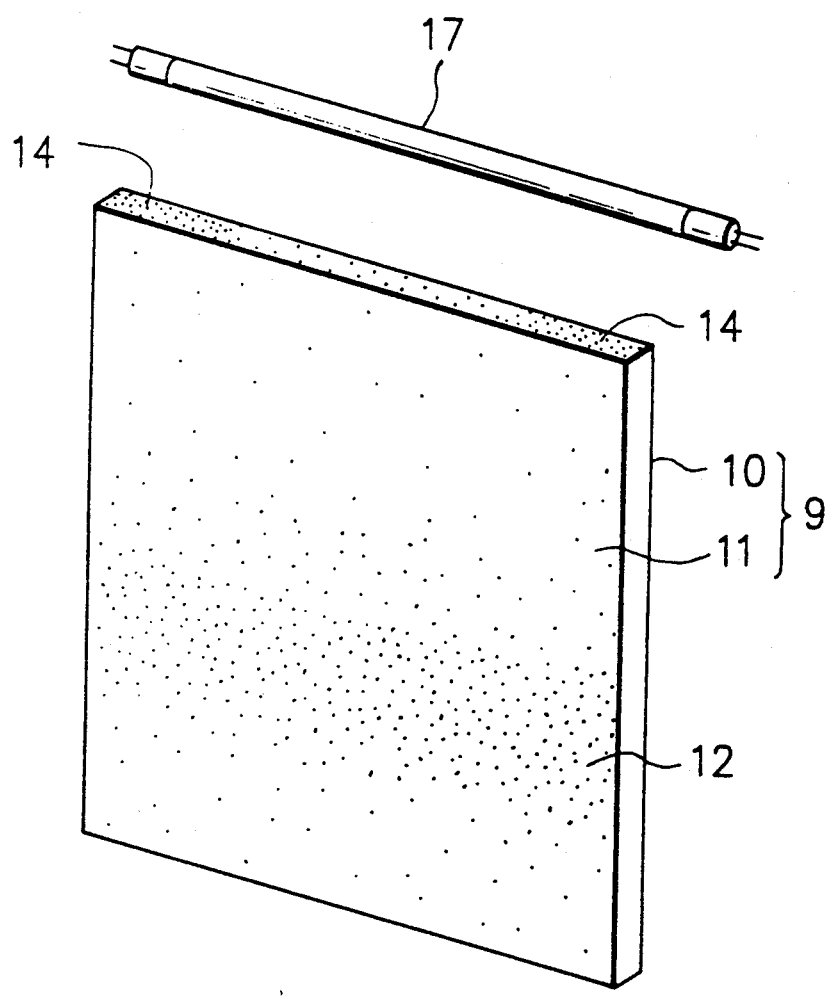
FIG. 9 is an exploded perspective view of a fifth embodiment of the edge light panel of the present invention.

FIG. 9 illustrates a fifth embodiment of the edge light panel of the present invention, wherein the surface of the lateral side 14 juxtaposed with a single primary light source 17 is coarsely finished with a degree of coarseness which varies in a stepwise manner depending on the longitudinal position thereof along the lateral side with the end portions being most coarsely treated. It was proved in an experiment that the brightness of this embodiment was greater by approximately several percent, and the uniformity of brightness was remarkable.

Since all the remaining components of this embodiment are similar to those of the preceding embodiments, they are indicated by identical reference numerals and will not be further described.

The mode of and the process of forming the irregular reflector surface of an edge light panel according to the invention are not limited to those described above by referring to the preferred embodiments. For instance, a screen printing technique using pale or white ink containing a white pigment such as titanium oxide, a mechanical shot blasting technique, a photo-sensing method using sensitized paper, an integral molding technique, or any other appropriate technique may be selectively used for formation of meshed patterns, provided that the illuminating surface area near the primary light source is equipped with an irregular reflector.

When a surface of an edge light panel according to the invention is screen printed for formation of an irregular reflector surface, the densely screen printed zone has advantageously a width which is approximately 10 to 20% of the length of the edge light panel, and the surface should be the back side surface of the edge light panel.

A coarse surface may be formed on the lateral side of the transparent resin substrate juxtaposed with the primary light source by means of a cutting/finishing technique as described earlier by referring to the first embodiment, by a shot blasting technique or by a technique for integrally forming the coarse surface at the time of preparing the transparent resin substrate, although the last mentioned technique may be somewhat costly. Alternatively, a coarse surface may be realized by using a ceramic rotary cutter whose sharp edge is cut off and flattened or rounded. The coarseness of the surface realized by using such a rotary cutter is substantially similar to that of the surface prepared by any of the above described techniques.

A lateral side of an edge light panel according to the invention may be treated to form a coarse surface either before or after the formation on it of an irregular reflector surface except in the case where the screen printing technique should be applied to the transparent resin substrate to form an irregular reflector surface after the treatment for forming the coarse surface on the lateral side has been completed in order to keep the produced irregular reflector surface intact.

The coarse surface should carry a large number of tiny projections and depressions in order to effectively and forcibly diffuse the light thereon. Such projections and depressions may be regularly arranged in any direction or alternatively randomly arranged to securely catch the incident light and forcibly diffuse it in all directions.

The coarse surface may be formed on part of a lateral side of an edge light panel according to the invention or, alternatively, it may be formed on the entire region of a lateral side depending on the properties of the irregular reflector surface, the type of the primary light source, the desired level of brightness and other factors. The degree of coarseness may be either stepwise or steplessly varied. For instance, if the primary light source is arranged close to and in parallel with the corresponding lateral side in such a manner that an end of the primary light source is located somewhere near the middle point of the side, a coarse surface may be formed at or near the middle point and the coarseness may be varied either stepwise or steplessly (i.e. intermittently or continuously). Similarly, when a bulb-shaped primary light source is used, the corresponding lateral side of the edge light panel should be partly made coarse on an intermittent basis, and the interval between any two adjacent one of the coarse regions should vary by location on the lateral side.

The transparent resin substrate for the purpose of the present invention should be made of a known material having a high light transmittivity such as acrylic resin or polycarbonate resin. The edge light panel may be realized in the form of a multi-layered panel with a diffuser sheet arranged between any two adjacent layers. The edge light panel may be realized in a form other than rectangular, for instance, in a circular form with a semi-circular "lateral side" juxtaposed with a primary light source.

As is apparent from the above description, while the present invention has been described particularly by referring to the preferred embodiments, it is not limited thereto and the embodiments may be modified without departing from the scope of the present invention in terms of the configuration, position, size, material, number, method of formation and mode of installation of the irregular reflector surface, transparent resin substrate and primary light source(s). Moreover, the reflector surface may carry an evenly arranged or intricately modified pattern depending on the conditions under which it is installed and operated.

With an edge light panel according to the invention and having a configuration as described above, the lateral side juxtaposed with the primary light source and provided with a coarse surface securely catches the incident light emitted from the primary light source and forcibly diffuses the light in all directions so that the potential capacity of the reflector surface of the edge light panel for irregular reflection may be fully exploited to enhance the brightness and uniformity of the edge light panel.

Since the intended effect of uniform brightness of an edge light panel according to the present invention is achieved by simply treating a lateral side of the edge light panel to provide a coarse surface, it can be manufactured at a relatively low cost and is hardly subject to deterioration over time.

What is claimed is:

1. An edge light panel for a surface light source device having at least one primary light source, comprising:
   a transparent resin substrate having a plurality of edge surfaces about a periphery thereof, a front surface, and a rear surface;
   wherein said rear surface of said transparent resin substrate has a mesh pattern formed thereon to define an irregular reflection surface;
   wherein at least one of said plurality of edge surfaces is adapted to be juxtaposed with the at least one primary light source, and comprises means for permitting light from the at least one primary light source incident on said at least one of said plurality of edge surfaces, respectively, to pass through said at least one of said plurality of edge surfaces and into said transparent resin substrate;
   wherein said means comprises a roughened portion of said at least one of said plurality of edge surfaces;
   wherein said roughened portion of said at least one of said plurality of edge surfaces is formed intermittently along said at least one of said plurality of edge surfaces; and
   wherein said mesh pattern has mesh sizes which vary as a function of the distance from said at least one of said plurality of edge surfaces.

2. An edge light panel for a surface light source device having at least one primary light source, comprising:
   a transparent resin substrate having a plurality of edge surfaces about a periphery thereof, a front surface, and a rear surface;
   wherein said rear surface of said transparent resin substrate has a mesh pattern formed thereon to define an irregular reflection surface;
   wherein at least one of said plurality of edge surfaces is adapted to be juxtaposed with the at least one primary light source, and comprises means for permitting light from the at least one primary light source incident on said at least one of said plurality of edge surfaces, respectively, to pass through said at least one of said plurality of edge surfaces and into said transparent resin substrate;
   wherein said means comprises a roughened portion of said at least one of said plurality of edge surfaces;
   wherein said roughened portion of said at least one of said plurality of edge surfaces is formed over only a part of said at least one of said plurality of edge surfaces; and
   wherein said mesh pattern has mesh sizes which vary as a function of the distance from said at least one of said plurality of edge surfaces.

3. An edge light panel for a surface light source device having at least one primary light source, comprising:
   a transparent resin substrate having a plurality of edge surfaces about a periphery thereof, a front surface, and a rear surface;
   wherein said rear surface of said transparent resin substrate has a mesh pattern formed thereon to define an irregular reflection surface;
   wherein at least one of said plurality of edge surfaces is adapted to be juxtaposed with the at least one primary light source, and comprises means for permitting light from the at least one primary light source incident on said at least one of said plurality of edge surfaces, respectively, to pass through said at least one of said plurality of edge surfaces and into said transparent resin substrate;

wherein said means comprises a roughened portion of said at least one of said plurality of edge surfaces;

wherein said roughened portion of said at least one of said plurality of edge surfaces is formed only near opposing ends of said at least one of said plurality of edge surfaces; and wherein said mesh pattern has mesh sizes which vary as a function of the distance from said at least one of said plurality of edge surfaces.

4. An edge light panel for a surface light source device having at least one primary light source, comprising:

a transparent resin substrate having a plurality of edge surfaces about a periphery thereof, a front surface, and a rear surface;

wherein said rear surface of said transparent resin substrate has a mesh pattern formed thereon to define an irregular reflection surface;

wherein at least one of said plurality of edge surfaces is adapted to be juxtaposed with the at least one primary light source, and comprises means for permitting light from the at least one primary light source incident on said at least one of said plurality of edge surfaces, respectively, to pass through said at least one of said plurality of edge surfaces and into said transparent resin substrate;

wherein said means comprises a roughened portion of said at least one of said plurality of edge surfaces;

wherein said roughened portion of said at least one of said plurality of edge surfaces is formed with a degree of coarseness which varies along said at least one of said plurality of edge surfaces; and wherein said mesh pattern has mesh sizes which vary as a function of the distance from said at least one of said plurality of edge surfaces.

5. An edge light panel as recited in claim 4, wherein said degree of coarseness varies in a continuous manner along said at least one of said plurality of edge surfaces.

6. An edge light panel as recited in claim 4, wherein said degree of coarseness varies in a stepwise manner along said at least one of said plurality of edge surfaces.

7. An edge light panel as recited in claim 4, wherein said at least one of said plurality of edge surfaces comprises two opposing ones of said plurality of edge surfaces.

8. An edge light panel as recited in claim 7, wherein said mesh pattern is formed on said rear surface of said transparent resin substrate in such a manner that the mesh sizes are largest in a zone midway between said two opposing ones of said plurality of edge surfaces.

9. An edge light panel as recited in claim 8, wherein said zone is elongated in parallel with said two opposing ones of said plurality of edge surfaces.

10. An edge light panel as recited in claim 4, wherein said at least one of said plurality of edge surfaces comprises only one of said plurality of edge surfaces.

11. An edge light panel as recited in claim 10, wherein said mesh pattern is formed on said rear surface of said transparent resin substrate in such a manner that the mesh sizes are largest in a zone between said only one of said plurality of edge surfaces and another one of said plurality of edge surfaces opposite said only one of said plurality of edge surfaces, and nearer to said another one of said plurality of edge surfaces.

12. An edge light panel as recited in claim 11, wherein said zone is elongated in parallel with said only one of said plurality of edge surfaces.

13. An edge light panel as recited in claim 3, wherein said at least one of said plurality of edge surfaces comprises two opposing ones of said plurality of edge surfaces.

14. An edge light panel as recited in claim 3, wherein said at least one of said plurality of edge surfaces comprises only one of said plurality of edge surfaces.

15. An edge light panel as recited in claim 2, wherein said at least one of said plurality of edge surfaces comprises two opposing ones of said plurality of edge surfaces.

16. An edge light panel as recited in claim 2, wherein said at least one of said plurality of edge surfaces comprises only one of said plurality of edge surfaces.

17. An edge light panel as recited in claim 1, wherein said at least one of said plurality of edge surfaces comprises two opposing ones of said plurality of edge surfaces.

18. An edge light panel as recited in claim 1, wherein said at least one of said plurality of edge surfaces comprises only one of said plurality of edge surfaces.

* * * * *